United States Patent [19]
Farr

[11] 4,324,101
[45] Apr. 13, 1982

[54] HYDRAULIC MASTER CYLINDERS FOR VEHICLE BRAKING SYSTEMS

[75] Inventor: Glyn P. R. Farr, Warwickshire, England

[73] Assignee: Girling Limited, Birmingham, England

[21] Appl. No.: 700,134

[22] Filed: Jun. 28, 1976

[30] Foreign Application Priority Data

Jun. 27, 1975 [GB] United Kingdom ............... 27205/75
Aug. 2, 1975 [GB] United Kingdom ............... 32398/75

[51] Int. Cl.³ ............................................. B60T 11/20
[52] U.S. Cl. .................................................. 60/562
[58] Field of Search ........................ 60/562, 574, 581

[56] References Cited

U.S. PATENT DOCUMENTS 3,140,587 7/1964 Stelzer .................................. 60/562
3,168,351 2/1965 Stelzer .................................. 60/562
3,488,959 1/1970 Tenniswood ......................... 60/562
3,752,273 8/1973 Haraikawa ............................ 60/562

FOREIGN PATENT DOCUMENTS 1354987 5/1974 United Kingdom .

Primary Examiner—Abraham Hershkovitz
Attorney, Agent, or Firm—Scrivener, Clarke, Scrivener and Johnson

[57] ABSTRACT

A tandem master cylinder is disclosed having primary and secondary pistons which are freely movable apart, the pistons defining one wall of respective pressure chambers connected to primary and secondary braking circuits. The ratio of the effective areas of the piston are selected to lie in the range 0.2 to 0.8 resulting in the availability of the full effective area of the primary piston upon failure of the secondary system, with substantially decreased pedal travel over that required in prior systems where the pistons are freely movable apart but are of equal effective area.

11 Claims, 1 Drawing Figure

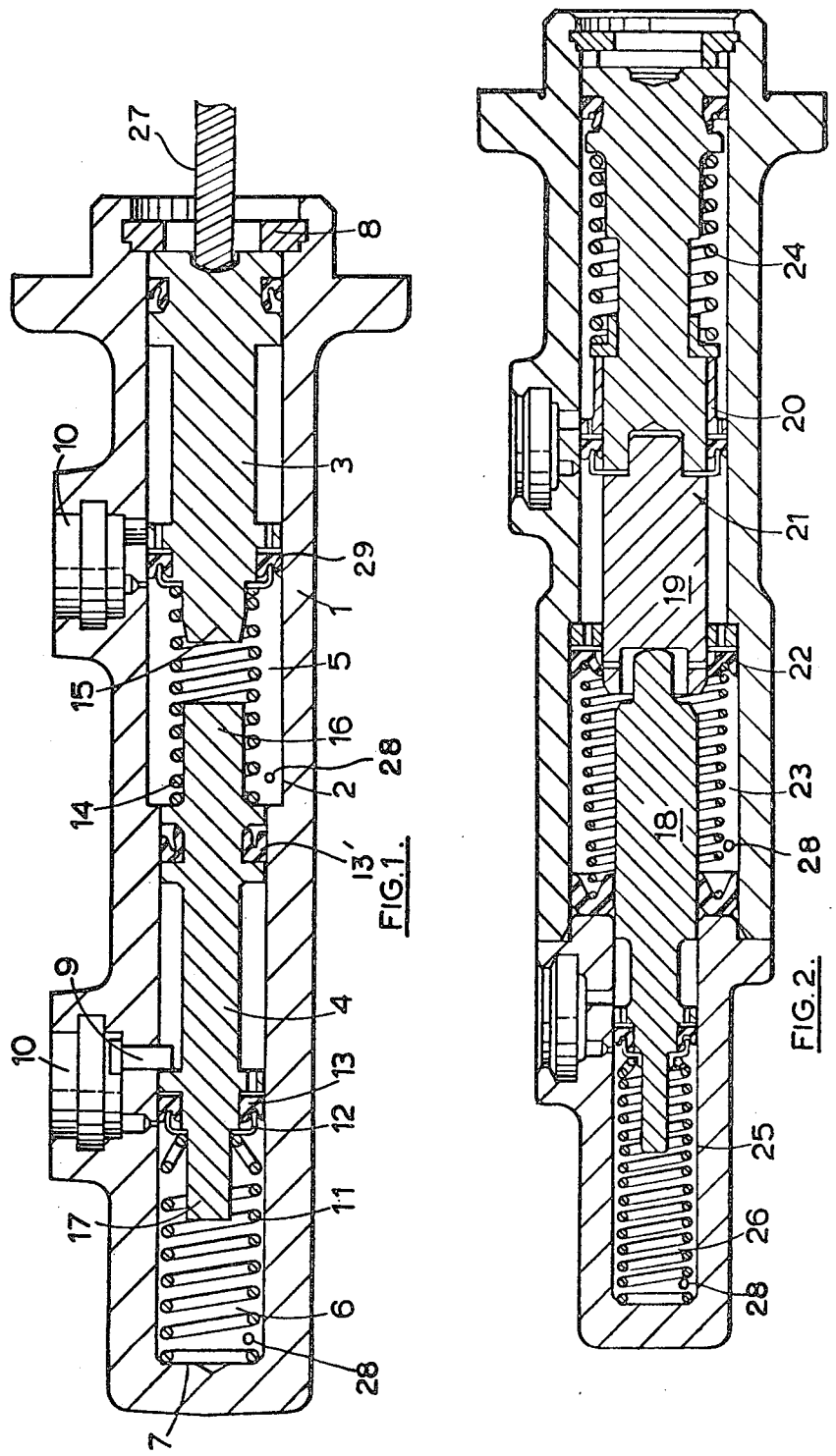

HYDRAULIC MASTER CYLINDERS FOR VEHICLE BRAKING SYSTEMS

This invention relates to a tandem master cylinder for a vehicle hydraulic braking system.

In a tandem master cylinder primary and secondary pistons work in a bore in the master cylinder housing, a primary pressure space for connection to a primary braking circuit is defined between the pistons, and a secondary pressure space for connection to a secondary braking circuit is defined between the secondary piston and the closed inner end of the bore.

The basic form of tandem master cylinder has a bore of uniform diameter with pistons of equal diameters, and there is no mechanical connection between the pistons for limiting their separation so that the pistons are freely movable apart relative to each other.

In order to apply the brakes connected to one of the braking circuits an initial volume of fluid must be supplied by the master cylinder to take up the clearances in the brakes, and then a further volume of fluid associated with the generation of the braking forces. The size of the initial volume of fluid depends upon the magnitude of the brake clearances and may vary quite widely in dependence upon their adjustment.

On application of the brakes the volume of fluid in the primary pressure space of the master cylinder will therefore be reduced by the sum of these two volumes associated with the primary circuit, and the pistons must be arranged to be sufficiently spaced apart in their fully retracted positions so that this total volume of fluid can be supplied from the primary pressure space without the pistons coming together during application of the brakes even when the clearances of the brakes connected to the primary circuit are at a maximum.

With the basic arrangement of a tandem master cylinder the pistons must therefore be spaced apart in their retracted positions by a substantial amount, and this has the considerable disadvantage that in the event of a failure of the primary braking circuit the primary piston has to travel a long distance before it engages with the secondary piston to enable the secondary braking circuit to be pressurised. Thus, upon failure of the primary circuit the position of the pedal is altered by a large amount which is a disadvantage.

One object of the present invention is to reduce the spacing between the pistons in their retracted positions such that upon failure of the primary braking circuit the primary piston does not have to travel as far before it engages with the secondary piston.

The two braking circuits may be arranged in various ways but a common way is for the primary pressure space to be connected to brakes on the front wheels of the vehicle with the secondary space connected to brakes on the rear wheels. Often the arrangement is such that in normal operation the front brakes generate a greater braking force than the rear brakes.

Legislation in some countries now specifies that with such a system a minimum braking retardation for a maximum pedal effort must be achieved when only one of the circuits is in operation. It is often difficult to achieve the minimum braking retardation upon failure of the primary circuit in systems in which the primary circuit of the basic master cylinder normally provides the major proportion of the braking forces. Often to meet the regulations it is necessary to provide the master cylinder with a booster in order to achieve a sufficient braking force upon failure of the primary circuit.

In order to overcome the problem associated with basic master cylinders of the increased pedal travel upon failure of one of the circuits it is known to connect the pistons with a lost motion connection. To enable pressure to be generated in the primary pressure space upon failure of the secondary pressure space it is then necessary to make the primary piston of larger diameter than the secondary piston and to use a stepped bore. Some examples of master cylinders of this kind are described in the Complete Specification of our U.K. Pat. No. 1,354,987.

However, tandem master cylinders of that kind are not suitable for use with braking systems in which the primary circuit supplies the major proportion of the braking forces, since in the event of a failure of the secondary braking circuit the effective area of the primary piston is then equal only to the difference in cross-sectional areas of the two pistons.

According to one aspect of the invention we provide a tandem master cylinder comprising primary and secondary pistons working in a bore in the cylinder housing, a primary pressure space being defined between the pistons for connection to a primary braking circuit, and a secondary pressure space being defined between the secondary piston and the closed inner end of the bore for connection to a secondary braking circuit, wherein the pistons are of unequal cross-sectional areas and are not connected by means limiting their maximum separation, the ratio of the cross-sectional area of the secondary piston to that of the primary piston lying in the range 0.2 to 0.8.

Since there is no lost motion connection between the pistons they are freely movable apart relative to each other.

In the complete specification of our U.K. Patent Application No. 977,268 a tandem master cylinder is shown in which the bore is slightly stepped and there is no lost connection between the pistons. However, in that construction the ratio of the cross-sectional areas of the pistons is approximately 0.9. There is an insufficient difference in diameters as compared with a plain bore conventional master cylinder to be of any practical benefit. The bore was stepped in that construction with the object of preventing a seal on the secondary piston from coming into contact with and being damage by a radial recuperation port in the cylinder wall for the primary pressure space during assembly of the secondary piston into the bore from its outer end.

Preferably the ratio lies in the range 0.25 to 0.75.

Particular advantage is achieved with a ratio of 0.5 since such a master cylinder is particularly adapted for use with a braking systems in which the volumes of fluid required for the two brake circuits are in the ratio 2:1.

Preferably the pistons are urged apart by resilient means which conveniently comprises a coiled compression spring fitting over axial spigots on adjacent ends of the pistons, the spigots engaging each other in the event of a failure of the primary circuit to transmit the pedal force from the primary piston to the secondary piston.

The spring may be caged.

The novel master cylinder in accordance with the invention will now be compared with a conventional tandem master cylinder having uncoupled pistons of diameters each equal to that of the primary piston of the novel master cylinder.

During normal braking the primary piston of the novel master cylinder will move by the same amount as that of the conventional cylinder since the total volume of fluid expelled from the two pressure spaces in front of it will be the same in each case. However, since the secondary piston is of reduced diameter, and the volume of the secondary pressure space is reduced during braking by the same amount in both cases, the secondary piston of the novel cylinder moves forward by a larger amount than the secondary piston of the conventional cylinder. Thus the spacing between the pistons of the novel master cylinder does not become reduced during normal braking as much as that in the conventional cylinder, and the spacing may, in fact, be arranged to increase.

The novel master cylinder may therefore be arranged to have a reduced or zero spacing between the pistons when in their fully retracted positions as determined by suitable stop means. This has the advantage that in the event of a failure of the primary circuit the pedal travel associated with the primary piston moving into engagement with the secondary piston may be reduced.

The reduced diameter of the secondary piston enables the braking regulations to be met even in the event of a failure of the primary circuit, since the pedal force is reduced for a given pressure of fluid in the secondary circuit.

Since the diameter of the secondary piston has been reduced its stoke must be increased in order to supply an equal volume of fluid. However, this increase in the stroke is compensated for by the reduction in the initial spacing of the pistons so that the master cylinder need not be any longer than the conventional cylinder.

In the event of a failure of the secondary circuit the pressure generated in the primary pressure space is proportional to the crosssectional area of the primary piston, and not, as with previous stepped-bore actuators having connected pistons, proportional to the difference in areas of the two pistons. The novel actuator is therefore particularly suitable for use in braking systems in which the primary circuit supplies the major proportion of the braking effort.

Such systems are well known. An example is a system in which brakes on each of the front wheels are applied by the primary circuit, and brakes on each of the rear wheels are applied by the secondary circuit, the braking effort exerted by the primary circuit being, for example, twice that exerted by the secondary circuit.

According to a second aspect of the invention a dual circuit braking system incorporates a master cylinder in accordance with the first aspect of the invention, the primary and secondary pressure spaces of the master cylinder being respectively connected to primary and secondary braking circuits, and the volume of fluid required on application of the brakes by the primary circuit being greater than the volume required by the secondary circuit.

We have previously referred to known tandem master cylinders in which the primary piston is of larger diameter than the secondary piston but in which the pistons are connected by a lost-motion connection. Such master cylinders are suitable for use with two braking circuits which require approximately equal volumes of fluid for operating the brakes. If a master cylinder of that kind were to be used with two braking circuits in which the primary circuit connected to the primary pressure space requires a substantially great volume of fluid for operation of the brakes connected to it than the volume required by the secondary circuit, for example twice the volume, the primary piston would need to be further increased in area relative to the secondary piston. With such an arrangement volumes of fluid that may be 'knocked back' to the primary and secondary pressure spaces during braking would differ considerably. In order to allow for this it would be necessary to increase the range of relative movement of the pistons as controlled by the lost-motion connection between them. This would be a serious disadvantage since it would increase the pedal-travel required to take up the increased play in the lost-motion connection in the event of a failure of either of the braking circuits.

This advantage is avoided by omission of the lost-motion connection.

Preferably the ratio of the volume of fluid required by the primary braking circuit to that required by the secondary braking circuit on application of the brakes is substantially two and the ratio of the cross-sectional area of the secondary piston to that of the primary piston is substantially one half.

It will now be demonstrated that a system in accordance with the invention in which the primary circuit requires a greater volume of fluid than the secondary circuit has advantages, in relation to the pedal force required upon failure of the primary circuit, over a similar system but which incorporates a conventional master cylinder having pistons of identical size. Taking as an example a system in which the volume of fluid required by the primary circuit is twice that required by the secondary circuit, with a conventional plain bore master cylinder the pedal effort required to obtain a given braking retardation upon failure of the primary circuit as compared with that required for the same retardation when both circuits are in operation would be three times as much. However, in the system in accordance with the invention the pedal effort is increased by a factor of only 3/2 upon failure of the primary circuit to obtain the same braking retardation.

The invention will now be further described with reference to the accompanying drawings in which:

FIG. 1 is a longitudinal cross section of a hydraulic tandem master cylinder in accordance with the invention with the pistons being shown in their retracted positions; and FIG. 2 is a similar view of another master cylinder in accordance with the invention.

Referring firstly to FIG. 1, the master cylinder comprises a housing 1 formed with a stepped bore defined by walls 2 and 7 and in which work primary and secondary pistons 3 and 4 respectively. The primary piston 3 carries at its front end a first seal means in the form of an annular seal member 29 which seals the piston to the housing wall 2. The secondary piston 4 is sealed to the wall 2 by a second seal means comprising axially spaced apart annular seal members 13 and 13' carried by the secondary piston 4. A primary pressure space 5 is defined in the bore by the wall 3 together with the front of the primary piston 3, and the rear of the secondary piston 4 and is sealed by seal members 13' and 29. A secondary pressure space 6 is defined by walls 2 and 6 together with the front of the secondary piston 4, and is sealed by the seal member 13.

The pressure effective area of the front of the secondary piston 4, that is the area of the secondary piston when viewed normal to its axis that is exposed to the secondary pressure space 6, is equal to the pressure effective area of the rear of the secondary piston 4, the corresponding area exposed to the primary pressure space 5. In the construction of FIG. 1 the pressure effective area of the front and rear of the secondary piston simply corresponds to the maximum cross-sectional area of the secondary piston.

The corresponding pressure effective area of the front of the primary piston that is exposed to the primary pressure space is again in the construction of FIG. 1 simply equal to the maximum cross-sectional area of the primary piston.

The ratio of the maximum diameter of the secondary piston 4 to that of the primary piston 3 is approximately 0.78 so that the ratio of the pressure effective area of the front of the secondary piston to that of the front of the primary piston is approximately 0.61.

The primary piston is adapted to be applied by an actuating rod 27 connected to a pedal, not shown, and its retracted position is determined by a fixed ring 8 which acts as a backstop. The retracted position of the secondary piston 4 is determined by a pin 9 received in the base of one of two recesses 10 adapted to receive connections to hydraulic reservoirs.

Radial holes 28 in the wall of the housing are adapted to connect the primary and secondary pressure spaces permanently to the primary and secondary brake circuits respectively.

A coiled compression spring 11 acts between the inner end wall 7 of the bore and a retainer 12 for seal 13 on the secondary piston to urge the secondary piston against its stop 9. A weaker coiled compression spring 14 acts between the pistons and is located over axial spigots 15 and 16 on the primary and secondary pistons respectively.

In the event of a failure of the circuit connected to the primary pressure space 5 the spigots 14 and 15 at the pistons will engage one another so that the pedal force on the primary piston 3 is transmitted directly to the second piston.

It will be appreciated that the compression spring 14 is the only member connecting the pistons and that there is no means acting between the pistons to limit their separation. Thus, in the event of a failure of the secondary circuit the piston 4 on application of the brake pedal will move to engage the inner end wall 7 of the bore by means of a spigot 17 and then the primary pressure space 5 will become fully pressurised upon further movement of the primary piston. The full cross-sectional area of the primary piston 3 acts in pressurising the primary space 5 since the secondary piston remains stationary.

In the master cylinder of FIG. 2 secondary piston 18 is of smaller diameter than either of pistons 19 and 20 of a primary piston assembly 21, and secondary piston 18 abuts piston 19 in their fully retracted positions as shown.

On advancement of piston 19, piston 20 is initially carried with it so that the initial effective diameter of the primary piston assembly is the diameter of piston 20. Fluid is forced past seal 22 into primary pressure space 23 during this initial movement. Pressure builds up in pressure space 23 when the brake clearances associated with the primary braking circuit connected to pressure space 23 have been taken up. When the pressure in primary space 23 is sufficient to overcome spring 24 piston 20 remains stationary in the bore for further advancement of piston 19. The effective diameter of the primary piston assembly is then the diameter of piston 19.

During pressurisation of primary pressure space 23 piston 18 advances in bore portion 25 to drive fluid from secondary pressure space 26 into a secondary braking circuit connected therewith. As previously explained, secondary piston 18 separates from piston 19 during this pressurisation sequence providing that both braking circuits are operational.

The use of a primary piston assembly incorporating a subsidiary piston 20 of relatively large area reduces the stroke of piston 19 and enables the secondary piston 18 to be arranged in abutment with piston 19 in the retracted positions of the pistons 18 and 19.

What we claim is:

1. A vehicle hydraulic tandem master cylinder comprising a housing provided with a wall defining a bore which is closed at its forward end, primary and secondary pistons in said bore with said secondary piston in front of said primary piston, said primary and secondary pistons being freely movable apart relative to each other for their maximum range of separation permitted by the dimensions of said bore, said primary piston having a front and a rear, said secondary piston having a front and a rear, an actuating rod engaging with said rear of said primary piston, first seal means sealing said primary piston to said wall, and second seal means sealing said secondary piston to said wall, said rear of said secondary piston together with said wall and said front of said primary piston bounding a primary pressure space sealed by said first and second seal means, said front of said secondary piston together with said wall bounding a secondary pressure space sealed by said second seal means, first and second outlet means passing through said wall and communicating permanently with said first and second pressure spaces respectively for connecting said pressure spaces to first and second braking circuits respectively, said front and said rear of said secondary piston having substantially equal pressure effective areas, and the ratio of the pressure effective area of said front of said secondary piston to the pressure effective area of said front of said primary piston lying in the range 0.2 to 0.8.

2. A tandem master cylinder as claimed in claim 1, in which the ratio is in the range 0.25 to 0.75.

3. A tandem master cylinder as claimed in claim 2, in which the ratio is substantially 0.5.

4. A tandem master cylinder as claimed in claim 1 in which the pistons are urged apart by resilient means acting between the pistons.

5. A tandem master cylinder as claimed in claim 1 in which the pistons engage each other in their retracted positions.

6. A vehicle hydraulic braking system incorporating a tandem master cylinder in accordance with claim 1 in which the primary and secondary braking circuits are respectively connected to said first and second outlet means respectively, and the volume of fluid required by the primary circuit on application of the brakes is greater than the corresponding volume required by the secondary circuit.

7. A vehicle hydraulic braking system incorporating a tandem master cylinder in accordance with claim 1 in which primary and secondary braking circuits are respectively connected to said first and second outlet means, and the ratio of the volume of fluid required on application of the brakes by the primary circuit to that required by the secondary circuit is substantially two.

8. A master cylinder as in claim 1 wherein said secondary pressure space is the sole pressure space defined in said bore in front of said secondary piston.

9. A master cylinder as in claim 1 wherein said second seal means comprises axially spaced apart first and second annular seal members.

10. A master cylinder as in claim 1 wherein said bore is stepped and comprises a larger diameter bore portion and a smaller diameter bore portion, said primary piston is a sliding fit in said larger diameter portion and said secondary piston is a sliding fit in said smaller diameter bore portion.

11. A master cylinder as in claim 4 wherein said secondary piston is urged rearwardly against a stop in the bore by further resilient means located in the bore in front of said secondary piston.

* * * * *